United States Patent [19]

Etienne et al.

[11] Patent Number: 5,189,918
[45] Date of Patent: Mar. 2, 1993

[54] "NULL" FLOW SENSOR

[75] Inventors: Stephen D. Etienne, Hayes; Donald C. Young, Pangbourne, both of England

[73] Assignee: Thorn EMI plc, London, England

[21] Appl. No.: 530,590

[22] Filed: Jun. 1, 1990

[30] Foreign Application Priority Data

Jun. 2, 1989 [GB] United Kingdom ............... 8912755

[51] Int. Cl.⁵ .............................................. G01F 1/28
[52] U.S. Cl. .................................................. 73/861.75
[58] Field of Search ............ 73/32 A, 517 R, 517 B, 73/861.71, 861.74, 861.75

[56] References Cited

U.S. PATENT DOCUMENTS

| | | | |
|---|---|---|---|
| 4,483,194 | 11/1984 | Rudolf | 73/517 B |
| 4,550,616 | 11/1985 | Mott | 73/861.74 |
| 4,598,585 | 7/1986 | Boxenhorn | 73/517 R |
| 4,848,157 | 7/1989 | Kobayashi | 73/517 |
| 4,890,480 | 1/1990 | Young | 73/32 A |
| 4,938,053 | 7/1990 | Jepson et al. | 73/861.74 |

FOREIGN PATENT DOCUMENTS 0239703 10/1987 European Pat. Off. .
0274201 7/1988 European Pat. Off. .

Primary Examiner—Herbert Goldstein
Attorney, Agent, or Firm—Keck, Mahin & Cate

[57] ABSTRACT

A flow sensing device includes a semiconductor substrate 31 and a pivoted beam 1. Below one half of the beam is a channel 7 running throughout the substrate 31, and below the other half of the beam is a cavity 8. During operation, a differential force exists across the beam, and the amount of force required to compensate for this differential force is indicative of the rate of fluid flow.

4 Claims, 4 Drawing Sheets

"NULL" FLOW SENSOR

The present invention relates to a device for measuring fluid flow and to a circuit for operating such a device.

Our published European Patent Application number 0239703 describes a flow sensing device in the form of a substrate of semiconductor material fabricated with a micro-engineered cantilever beam. It includes a means of sensing a characteristic of the beam which is indicative of fluid flow relative to the beam. This device has a limited range of flow rates capable of being measured, and in order to cover a wide range of flow rates, several such devices with different dimensions must be incorporated on the same silicon chip. Furthermore, to enable measurement of low flow rates, the cantilever beam must be thin and this can lead to problems with stress causing the beam to bend. Another disadvantage of this invention is that if the preferred capacitance variation measurement is used to determine the response of the cantilever beam to fluid flow, it is necessary that the fluid density be assumed constant. This enables the deflection of the cantilever beam to be considered dependent on the fluid velocity and independent of fluid mass. In practice, the density of the fluid will not be constant and a means of compensating for changes in fluid dielectric constant would be required.

It is thus an object of the present invention to provide a fluid flow sensing device which is suitable for production by means of the integrated circuit technology commonly known as micromachining, with advantages well known to that technology, and which at least alleviates some of the disadvantages of the prior art. A micromachined device is one which is constructed from some other part of the same device, and forms an integral part of it.

According to the present invention there is provided a flow sensing device comprising a substrate of semiconductor material and a micromachined beam, the device having first and second major surfaces, the first surface further defining a pivot about which the beam is able to twist under the action of fluid flow. Thus, by constructing part of the beam from the device material, manufacturing the device is made easier than with prior art devices.

Preferably the device is constructed so that there is a channel below one half of the beam which extends throughout the substrate, and there is a cavity below the other half of the beam, such that during operation fluid may flow through the channel thus exerting a force on one half of the beam and fluid fills the cavity thus creating a differential force across the beam. The device thus operates on a "null" principle in that a force is applied to the beam in order to compensate for the differential force caused by the effect of fluid flow upon the beam, this compensating force being indicative of the fluid flow rate.

In a further embodiment of this invention, the device is fabricated in a fully planar fashion and thus, unlike many prior art devices, negates the need for a second substrate to be added to the original substrate sandwiching the sensing beam between the two substrates.

In yet a further embodiment of this invention, there is provided a circuit suitable for operating such a device.

In yet a still further embodiment of this invention, there is provided a method of manufacturing such a flow sensing device.

In order that the invention may be clearly understood and readily carried into effect, it will be described, by way of example only, with reference to the accompanying drawings, of which:

FIGS. 4A, 4B, 4C and 4D schematically represent stages in a preferred method of fabrication of the device.

Figure 1A:
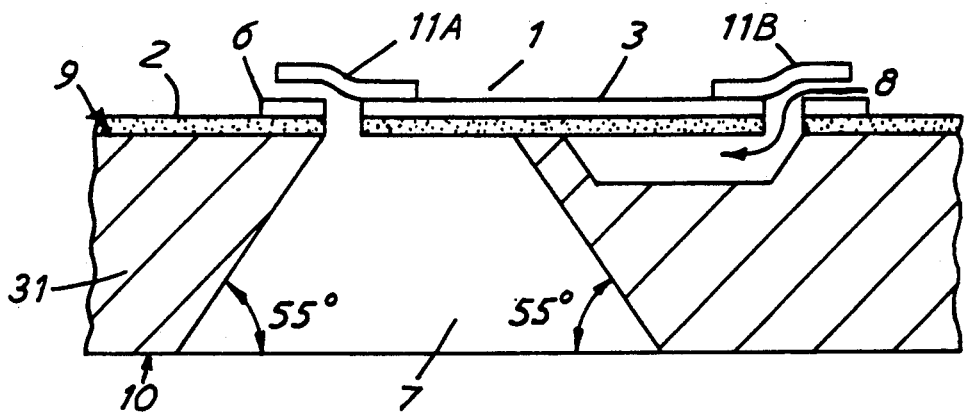
FIGS. 1A, 1B, 1C and 2 are schematic representations of a micromachined flow sensor.
Figure 1B:
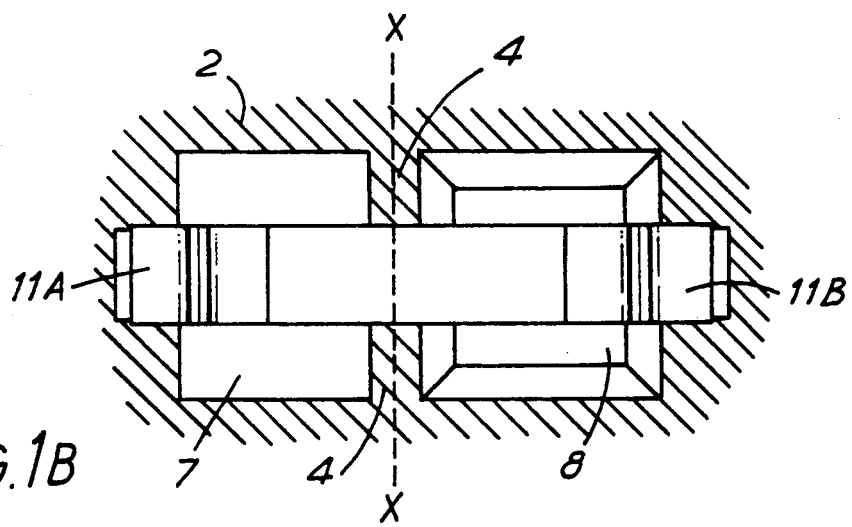
Figure 1C:
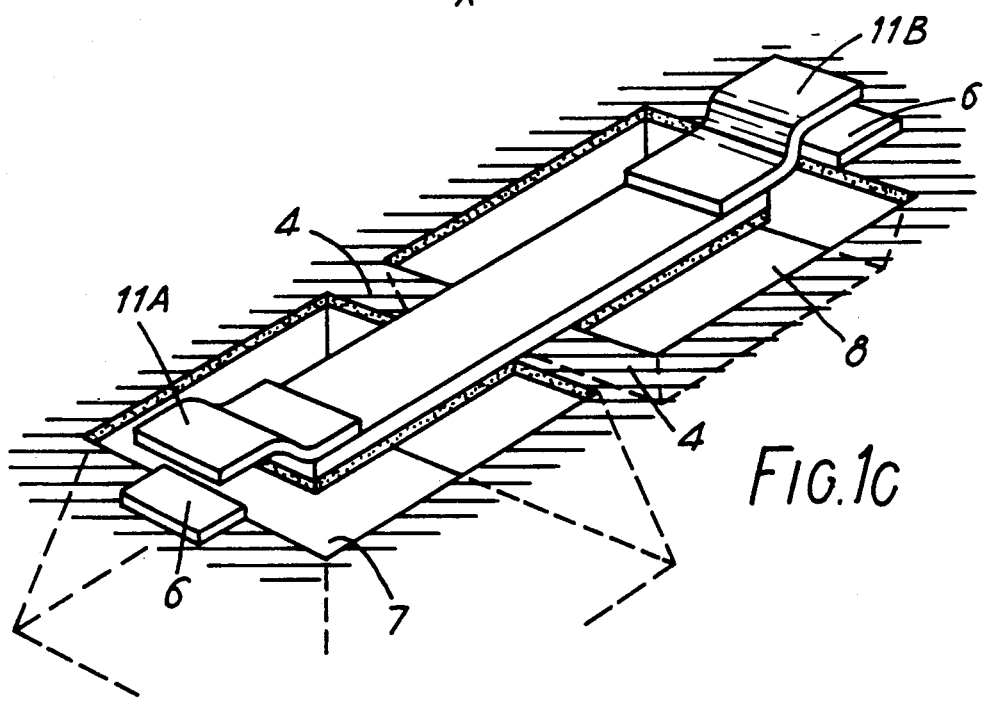

FIG. 1 shows a flow sensor in accordance with the present invention comprising a beam 1 fabricated from a thin insulating film 2 typically 0.5 micrometers thick, this film 2 is coated with a metal 3 which is typically 3 micrometers thick. This metal 3 ensures that the beam 1 is both rigid and flat. The beam 1 is pivoted, in this example, about its mid-point by supports 4 constructed from, and integral with, the same insulating layer as the beam. The beam is able to pivot about the axis X—X, and the pivot supports 4 are thin, typically 0.5 micrometers, so as not to affect the sensitivity of the device at low flow rates. The beam is supported above a semiconductor substrate 31.

Electrical contacts 11A, 11B are formed on the free ends of the beam, these act as one electrode of a capacitor. The other capacitor electrodes 6 are fabricated directly below these.

Below one half of the beam a channel 7 is formed which extends through the semiconductor substrate 31 from the first major surface of the substrate 9 on which the beam 1 is fabricated, to the opposite major surface 10 of the substrate. Thus the fluid whose flow is being measured is able to pass right the way through the substrate 31. A cavity 8 is formed below the other half of the beam 1. This cavity extends only part way through the substrate 31 and does not allow the passage of fluid through it. This then allows the device to operate on a "null" principle. This means that when the device is put in the path of a flowing fluid, because only one "through" channel exists, there will be a differential force across the beam and only the side of the beam above this "through" channel will experience this force.

In operation, a component of fluid flow normal to the major surfaces of the beam 1 in either direction will cause the beam 1 to twist about its pivot point, with the half of the beam above the "through" channel moving in the direction of the component of fluid flow acting upon it.

An electrostatic force is applied to the device contacts 11A, 11B in such a way as to return the beam to its equilibrium position. This equilibrium position is defined as being when the contact gap at zero fluid flow (Yo in FIG. 2) is equal on both sides of the beam, i.e. between 11A and 6 and 11B and 8.

The amount of electrostatic force required and the contacts to which it is applied, is determined by comparing the capacitance between the contacts 11A, 6 on one end of the beam to those on the other end of the beam 11B, 8. In this way changes in dielectric constant of the fluid do not affect the measurement of fluid flow. The upper limit of the range of fluid flow rates over which the device is capable of working is limited only by the amount of voltage available to apply sufficient electrostatic force.

In this way the fluid velocity may be obtained by utilizing the equation of motion of the overall system and standard feedback control theory. In practice, the deflection of the beam is small and the restoring force of the hinges is small compared to the force due to the fluid flow.

Figure 2:
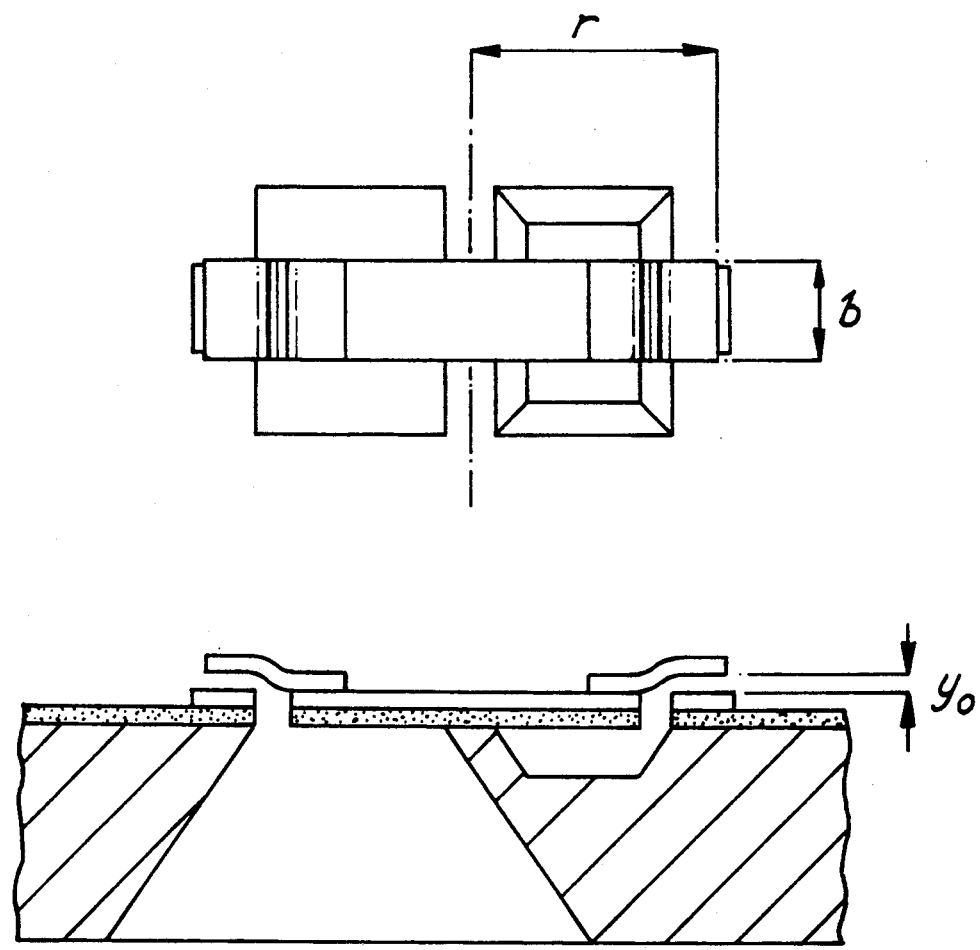
Figure 3:
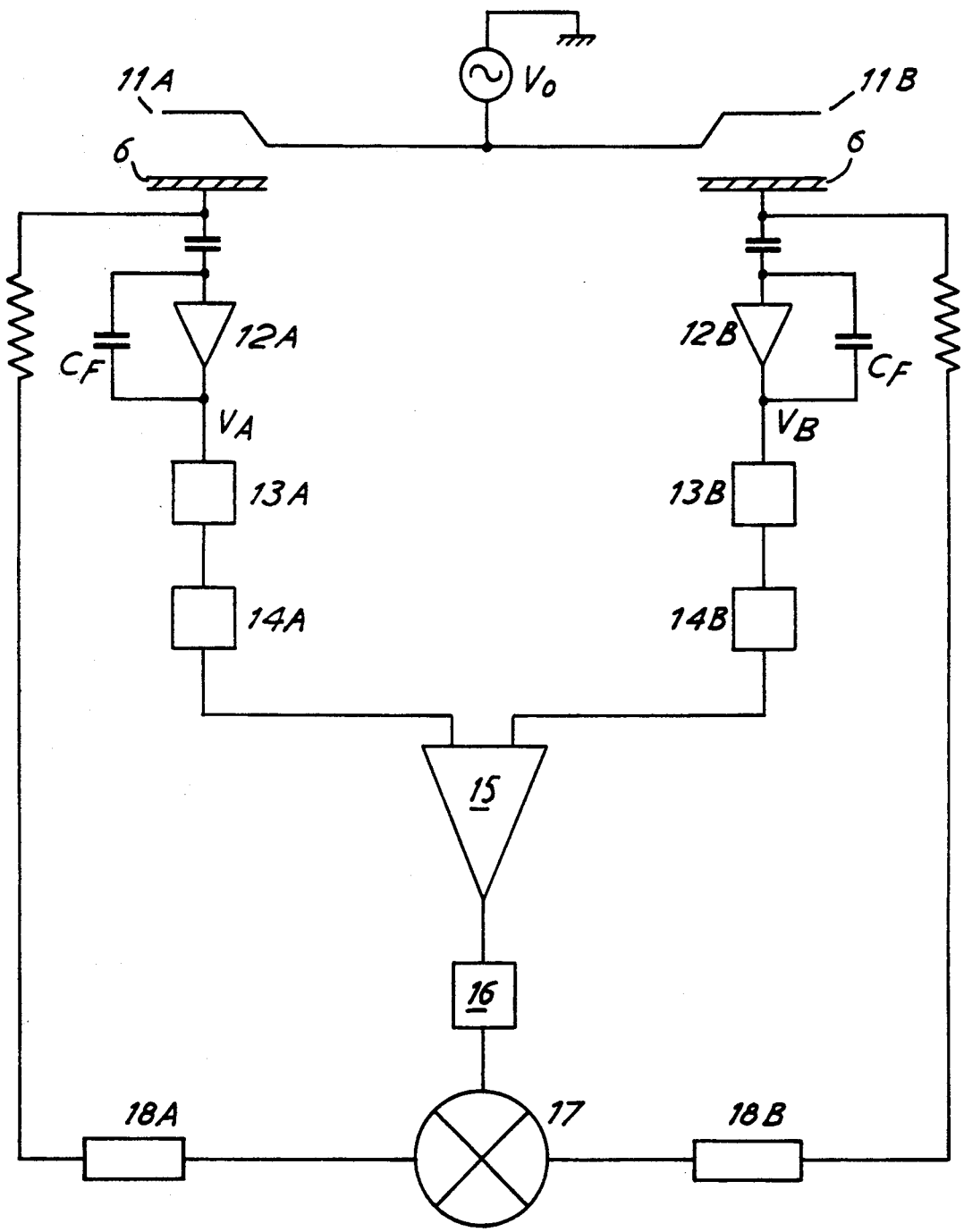
FIG. 3 is a block diagram of a typical circuit to operate the device.
Figure 4A:
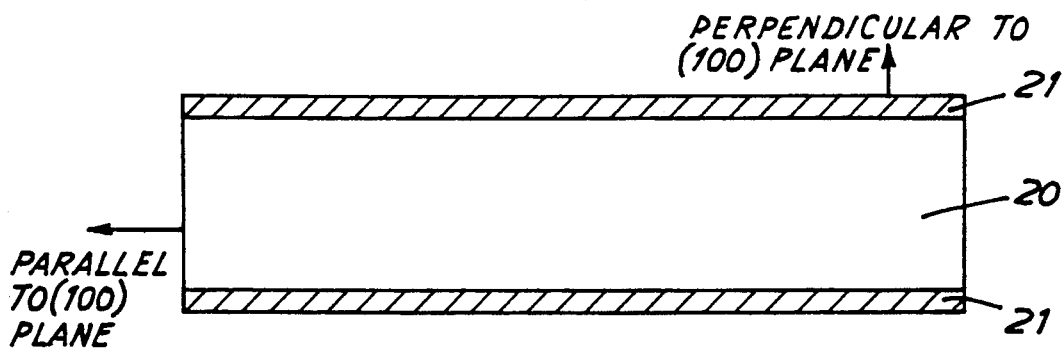
Figure 4B:
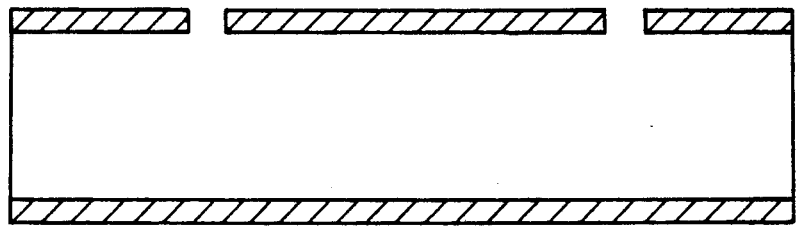
Figure 4C:
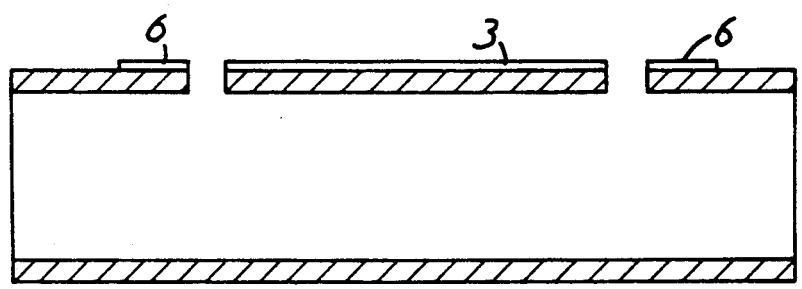
Figure 4D:
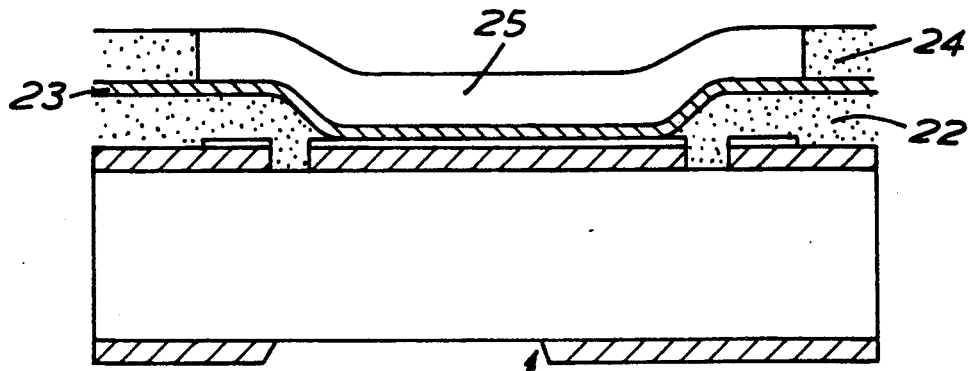

Referring now also to FIGS. 2 and 3, $$V = \sqrt{\frac{2\rho v^2 b r y_o^2}{4\epsilon A}} \text{ volts}$$

where:
V = Resulting Electrostatic force bringing the beam back to equilibrium.
ρ = Density of fluid (Kg/m$^3$)
v = velocity of fluid (m/s)
b = width of beam (m)
r = length of beam to hinge (on one side) (m)
yo = contact gap at zero fluid flow (m)
ε = permittivity of free space
A = Area of overlap of top and bottom contacts.

A functional block diagram of one suitable circuit for operating such a device is shown in FIG. 3.

A sine wave voltage $V_o$ is applied across the contacts 11A and 11B. Amplifiers 12A and 12B convert the capacitances between these contacts into a voltage given by:

$$V_B = \frac{V_o C_1}{C_F}, \quad V_A = \frac{V_o C_2}{C_F}$$

where C1 and C2 are the capacitances between the electrical contacts of the beam 11A, 11B and the electrodes 6 respectively.

$C_F$ is the feedback capacitance around the amplifiers 12A and 12B.

After amplification by amplifiers 13A and 13B and rectification by 14A and 14B the voltages are compared in a difference amplifier 15. The gain of 13B is adjusted so that with zero fluid velocity the output from the difference amplifier is zero.

The output from the difference amplifier is of positive or negative sign depending upon whether capacitance C1 or C2 is the greater. The switch 17 is designed to apply the amplified error voltage from 16 to the contacts with the smallest capacitance, the resulting electrostatic force bringing the beam back to its equilibrium position.

The square root function performed by 18A and 18B is an important addition to this circuit as it ensures the equation of motion for the overall system (including the flow sensor) is in the form of a linear differential equation, and hence is readily analysed using standard feedback control theory.

FIGS. 4A to 4D illustrate a preferred method of fabrication of the device, the method is described as follows:

a) A monocrystalline silicon wafer 20 typically 350 micrometers thick is prepared with the major surfaces lying in the 100 plane.
b) A layer 21 of an electrically insulating material e.g. silicon dioxide, silicon oxynitride or silicon nitride, typically 0.5 micrometers thick is deposited on the upper and lower surfaces. (FIG. 4A)
c) At this and subsequent stages, associated electrical circuits may be defined in the wafer.
d) Layer 21 is selectively etched to define the beam and its pivots 4. (FIG. 4B)
e) Layers of suitable metals such as chromium typically 0.1 micrometer thick followed by gold typically 0.3 micrometers thick, are deposited on the top insulating layer and patterned photolithographically to define fixed electrodes 6 and beam plating 3 (FIG. 4C).
f) Photoresist is spun onto the lower insulator and the insulator is patterned and etched to define the open channel 7 (FIG. 4D).
g) A layer of photoresist typically 3 micrometers thick is deposited to define the gap between the upper and lower contacts, and is patterened to define the beam plating area 3.
h) A plating base 23, typically 0.5 micrometers thick, and of any suitable metal such as gold, is deposited over the whole upper surface.
i) Photoresist 24 typically 4 to 5 micrometers thick is deposited over the top surface and patterned to define edges of the top contacts 11A and 11B.
j) Exposed metal is plated with a suitable metal such as gold 25 to a thickness of typically 3 micrometers which strengthens the beam to remove stress effects and also provides the top contacts 11A and 11B.
k) resist 24, exposed plating base 23, and resist 22 are all removed.
l) The channel 7 and the cavity 8 are formed by further anisotropic etching.

The invention is not limited by the illustrated embodiment; other structures and methods of manufacture thereof, together with suitable circuits within the inventive principles will be apparent to those with skills in the art.

We claim:

1. A fluid flow rate measurement device comprising:
   a substrate of semiconductor material from which is micromachined a beam having first and second free ends and a pivot structure midway between the first and second free ends about which the beam is capable of pivoting, said first and second free ends overlying first portions of the substrate defining a channel and a cavity respectively;
   further portions of the substrate adjacent said first portions, which further portions carry electrically conductive deposits thereby forming first electrode structures, and the first and second free ends of the beam having at least partially deposited thereon electrically conductive material defining further electrode structures to cooperate with said first electrode structures to form a plurality of capacitor electrode structures adapted to carry a variable electrical charge in order to exert an electrostatic force to counteract pivoting of the beam caused by a differential force exerted across the beam by fluid flowing into the cavity and through the channel.

2. A device according to claim 1, wherein the orientation of the beam defines a gap between said first and second electrode structures at said first and second free ends, the device including means for applying electrical charge to the first and further electrode structures such that said gap is of equal size at said first and second free ends.

3. A device according to claim 1 further comprising an electrical circuit, the circuit being adapted to measure fluid flow rate through the channel and including means for applying a sine wave across the first electrode structure thereby to generate capacitances between the first and further electrode structures at the first and second free ends of the beam, means for converting said capacitances into voltages representative of the electrical charge on each electrode structure, and a feedback control system for varying said voltages until said voltages are equal, the electrostatic force required to achieve said voltage equality being indicative of the fluid flow rate.

4. A circuit according to claim 3 wherein said feedback control system includes a difference amplifier arranged so that the polarity of the output of said difference amplifier is dependent upon said capacitances.

* * * * *